(No Model.)

O. A. WHEELER.
COASTER.

No. 332,575. Patented Dec. 15, 1885.

Witnesses.
N. A. Haseltine,
G. A. Haseltine.

Inventor.
Orrin A. Wheeler
By S. A. Haseltine & Bro.
Attorneys.

United States Patent Office.

ORRIN A. WHEELER, OF SPRINGFIELD, MISSOURI.

COASTER.

SPECIFICATION forming part of Letters Patent No. 332,575, dated December 15, 1885.

Application filed June 30, 1885. Serial No. 170,305. (No model.)

*To all whom it may concern:*

Be it known that I, ORRIN A. WHEELER, a citizen of the United States, residing at Springfield, in the county of Greene and State of Missouri, have invented certain new and useful Improvements in Coasters; and I do hereby declare the following to be a full, clear, and exact description of the invention, such as will enable others skilled in the art to which it appertains to make and use the same.

My invention relates to improvements in coasters, the object of which is to provide a cheap, simple, and durable device for coasting or sliding down inclined planes or hills, and at the same time one that may be easily guided by leaning in the direction it is desired to turn, without using brakes or dragging the feet to retard the velocity of the vehicle. These objects I attain by means of the device illustrated in the accompanying drawings, forming a part of this specification, in which—

Figure 1:
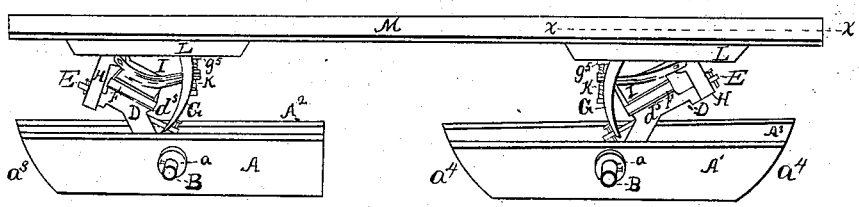
Figure 3:
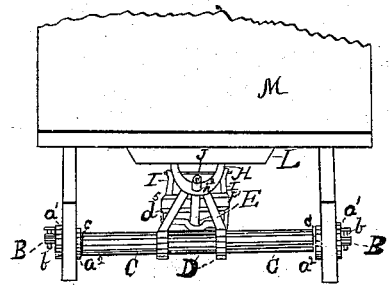
Figure 2:
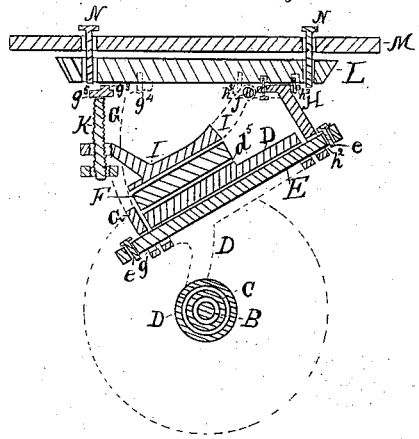

Figure 1 is a view of the entire device from the side. Fig. 2 is a section-line of Fig. 1, showing one truck. Fig. 3 is a detailed view from back elevation.

Similar letters of reference indicate corresponding parts in the several figures.

A A' A² A³ are runners of any desired size and shape, having holes $a$ to receive the axles B.

B is an axle, preferably a steel rod, having holes $b\ b$ to receive pins or keys $b'\ b'$. Said axle is placed through a sleeve, C, so as to freely revolve. The sleeve C may be made of gas-pipe or other suitable material, and is long enough to form the shoulders $c\ c$, against which washers $a^2$ rest.

$a'\ a^2$ are washers placed on each side of the runner to give it freedom of motion. Thus secured, the runner is free to turn with but little friction, as the axle has bearings in both the runner and the sleeve.

D is a wrist firmly secured to the sleeve and pivoted on an inclined axle-rod, E. Said wrist has a hole, $d$, to receive the inclined axle, the incline of which is from the front of the vehicle back and downward for the front runners or wheels, and in the reverse direction or slant on the hind trucks or runners on the hind axle. The vehicle is composed of two sets of trucks or axles, usually known as "bob sleds," having four runners or wheels, as desired, as shown. Wheels may be used in the place of the runners. The runners are preferably made with one point or front end, $a^3$, as it is more steady; but both ends of the runners may be made rounded or pointed, as shown, $a^4 a^4$, which enables the vehicle to run either way.

$d^5$ is a flat surface on the upper side of the piece or sleeve D, which is above the inclined axle E.

G and H are supports, having holes $g'\ h^2$ for receiving the inclined axle-rod E, which has pins or keys $e\ e$ to hold it in place. Said supports have suitable foot-pieces, provided with holes $g^4\ h^3$ for screws or bolts to attach them to the plate L. Support G has a cross-piece, $g^3$, with a flat upper surface, $g^5$, and support H has projections with holes $h$ to receive a bolt or rod, J, for hinging a piece, I, which has a hole, $i$, to receive a set-screw, K, to form with the plate $d^5$ a clamp, between which is secured a rubber block, F, springs, or other equivalent yielding substance.

M is a cover or top to which the plates L are secured by bolts N. To this cover may be secured a foot-rest in front and a seat behind, near the back part of the top, so that the rider faces the direction he is going, and by leaning to one side the two axles B are turned at an angle with the direction of the vehicle. The runners or wheels on the end of the axles on which the pressure is thrown are by the inclined axle-rods E E, which incline as stated above, thrown closer together, and the opposite wheels or runners are thrown apart, so that the vehicle is turned, as above stated.

The invention is intended for a coaster on snow and ice; but when snow and ice are gone wheels may be substituted for the runners, and the bearings and washers, as above, obviate nearly all friction in the various positions in turning. By means of the set-screw K the tension of the spring or rubber block F may be regulated according to the weight, and the weight might be placed on the coaster, so as to make it follow any desired path.

Having thus described my invention, what I claim as new, and desire to secure by Letters Patent, is—

1. In a coaster, the combination, with runners A A' A² A³, of revolving axles B B, wrists D D, sleeves C C, inclined axle-rods E E, supports G G H H, hinged piece I, having a set-screw, K, and a spring-block, F, pieces L L, and top M, all substantially as shown and described.

2. The combination, with axle-rods B B, having washers $a'$ $a^2$, and sleeves C C, having shoulders $c$ $c$, and the wrists D D, of the inclined axles E E, hinged piece I, for clamping, a spring-block, F, supports G G H H, and top M, all substantially as shown and described.

In testimony whereof I affix my signature in presence of two witnesses.

ORRIN A. WHEELER.

Witnesses:
W. I. MILLER,
S. A. HASELTINE.